United States Patent
Lee

(10) Patent No.: US 10,203,900 B2
(45) Date of Patent: Feb. 12, 2019

(54) MEMORY SYSTEM FOR SELECTING BLOCKS FOR GARBAGE SELECTION AND OPERATING METHOD THEREOF

(71) Applicant: SK hynix Inc., Gyeonggi-do (KR)

(72) Inventor: Jong-Min Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 22 days.

(21) Appl. No.: 15/406,320

(22) Filed: Jan. 13, 2017

(65) Prior Publication Data
US 2017/0322731 A1 Nov. 9, 2017

(30) Foreign Application Priority Data
May 4, 2016 (KR) .......................... 10-2016-0055488

(51) Int. Cl.
*G06F 3/06* (2006.01)
*G06F 12/02* (2006.01)

(52) U.S. Cl.
CPC .............. *G06F 3/064* (2013.01); *G06F 3/061* (2013.01); *G06F 3/0652* (2013.01); *G06F 3/0679* (2013.01); *G06F 3/0688* (2013.01); *G06F 12/0246* (2013.01); *G06F 2212/7201* (2013.01); *G06F 2212/7205* (2013.01)

(58) Field of Classification Search
CPC .. G06F 3/0679; G06F 3/0688; G06F 12/0246; G06F 2212/7201; G06F 2212/7205; G06F 2212/7211
See application file for complete search history.

(56) References Cited

U.S. PATENT DOCUMENTS

| | | | | |
|---|---|---|---|---|
| 7,870,351 | B2 | 1/2011 | Resnick | |
| 8,819,375 | B1 * | 8/2014 | Pruett | G06F 13/28 707/693 |
| 9,977,732 | B1 * | 5/2018 | Keeler | G06F 12/0802 |
| 2005/0235097 | A1 * | 10/2005 | Liang | G06F 12/0246 711/103 |
| 2011/0107056 | A1 * | 5/2011 | Kuo | G06F 12/0246 711/203 |
| 2013/0042052 | A1 * | 2/2013 | Colgrove | G06F 3/0608 711/103 |
| 2013/0166818 | A1 * | 6/2013 | Sela | G06F 12/0246 711/103 |

(Continued)

FOREIGN PATENT DOCUMENTS

| | | |
|---|---|---|
| KR | 101392174 | 5/2014 |
| KR | 101482013 | 1/2015 |

OTHER PUBLICATIONS

Gal et al. "Algorithms and Data Structures for Flash Memories." Jun. 2005. ACM. ACM Computing Surveys. vol. 37. pp. 138-163.*

*Primary Examiner* — Nathan Sadler
(74) *Attorney, Agent, or Firm* — IP & T Group LLP

(57) ABSTRACT

A memory system includes a memory device including a plurality of memory blocks; and a controller suitable for; storing user data corresponding to a write command received from a host, in the memory blocks, storing map data in response to storing of the user data, in the memory blocks, sorting map segments included in the map data, according to logical information of the user data, determining correlations for the memory blocks, through the map segments, and selecting source memory blocks among the memory blocks based on the determined correlations.

20 Claims, 11 Drawing Sheets

(56) References Cited

U.S. PATENT DOCUMENTS

| | | | |
|---|---|---|---|
| 2014/0089569 A1* | 3/2014 | Pignatelli | G06F 3/0611 |
| | | | 711/103 |
| 2014/0115238 A1* | 4/2014 | Xi | G06F 12/12 |
| | | | 711/103 |
| 2015/0178194 A1* | 6/2015 | Shaharabany | G06F 12/0253 |
| | | | 711/171 |
| 2015/0347296 A1* | 12/2015 | Kotte | G06F 12/0269 |
| | | | 711/103 |
| 2015/0347316 A1 | 12/2015 | Carofiglio et al. | |
| 2017/0132069 A1* | 5/2017 | Wang | G06F 11/0793 |
| 2018/0225122 A1* | 8/2018 | Kumano | G06F 9/3832 |

\* cited by examiner

US 10,203,900 B2

MEMORY SYSTEM FOR SELECTING BLOCKS FOR GARBAGE SELECTION AND OPERATING METHOD THEREOF

CROSS-REFERENCE TO RELATED APPLICATION

This application claims priority under 35 U.S.C. § 119 to Korean Patent Application No. 10-2016-0055488 filed on May 4, 2016 in the Korean Intellectual Property Office, the disclosure of which is incorporated herein by reference in its entirety,

TECHNICAL FIELD

Exemplary embodiments relate to a memory system, and more particularly, to a memory system which processes data with respect to a memory device, and an operating method thereof.

DISCUSSION OF THE RELATED ART

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having memory devices, for example, a data storage device. The memory system may be used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices memory cards h axing various interfaces and solid state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In an embodiment, a memory system may include a memory device and a controller. The memory device may include a plurality of memory blocks. The controller may be suitable for storing user data corresponding to a write command received from a host, in the memory blocks. The controller may stores map data in response to storing of the user data, in the memory blocks sorting map segments included in the map data, according to logical information of the user data. Further, the controller may determine correlations for the memory blocks, through the map segments, and selecting source memory blocks among the memory blocks based on the determined correlations.

The controller may determine the correlations for the memory blocks, through at least one of overlays and sequences of the logical information for the user data stored in the memory blocks.

The controller may select, as the source memory blocks, a first memory block and a second memory block which have an overlay in the logical information among the memory blocks.

The controller may select, as the source memory blocks, a first memory block and a second memory block which have a sequence in the logical information, among the memory blocks.

The logical information of the user data may include logical page numbers (LPNs) of the user data stored in the memory blocks.

The controller may generate a list by recording minimum logical page numbers and maximum logical page numbers of the map segments for the memory blocks, by indexes indicating the memory blocks, and stores the list in a memory of the controller.

The controller may determine the correlations for the memory blocks by checking the minimum logical page numbers and the maximum logical page numbers of the memory blocks from the list.

The map segments may include physical to logical (P2L) segments for the user data, in response to storing of the user data in the memory blocks.

The controller may sort indexes indicating storing in the memory blocks, in a sequence of the logical page numbers (LPNs) of the user data, in a physical to logical (P2L) table for the user data.

The controller may copy and may store data stored in valid pages of the source memory blocks, in target memory blocks among the memory blocks, and may perform an erase operation for the source memory blocks.

In an embodiment, a method for operating a memory system, may include: receiving a write command from a host, for a plurality of memory blocks of a memory device; storing user data corresponding to the write command, in the memory blocks; sorting and updating map segments of map data in response to storing of the user data, according to logical information of the user data; and selecting source memory blocks among the memory blocks, based on correlations for the memory blocks, through the map segments.

The selecting of the source memory blocks may include determining the correlations for the memory blocks, through at least one of overlays and sequences of the logical information for the user data stored in the memory blocks.

The selecting of the source memory blocks may include selecting, as the source memory blocks, a first memory block and a second memory block which have an overlap in the logical information among the memory blocks.

The selecting of the source memory blocks may include selecting, as the source memory blocks, a first memory block and a second memory block which have a sequence in the logical information, among the memory blocks.

The logical information of the user data may include logical page numbers (LPNs) of the user data stored in the memory blocks.

The method may further include: generating a list by recording minimum logical page numbers and maximum logical page numbers of the map segments for the memory blocks, by indexes indicating the memory blocks; and storing the list in a memory of the controller.

The selecting of the source memory blocks may include determining the correlations for the memory blocks by checking the minimum logical page numbers and the maximum logical page numbers of the memory blocks from the list.

The map segments may include physical to logical (P2L) segments for the user data, in response to storing of the user data in the memory blocks.

The sorting and updating of the map segments may include sorting indexes indicating storing in the memory blocks, in a sequence of the logical page numbers (LPNs) of the user data, in a physical to logical (P2L) table for the user data.

The method may further include: copying and storing data stored in valid pages of the source memory blocks, in target memory blocks among the memory blocks, and performing an erase operation for the source memory blocks.

BRIEF DESCRIPTION OF THE DRAWINGS

These and other features and advantages of the present invention of the present invention will be described in reference to the accompanying drawings, wherein.

DETAILED DESCRIPTION

Figure 1:
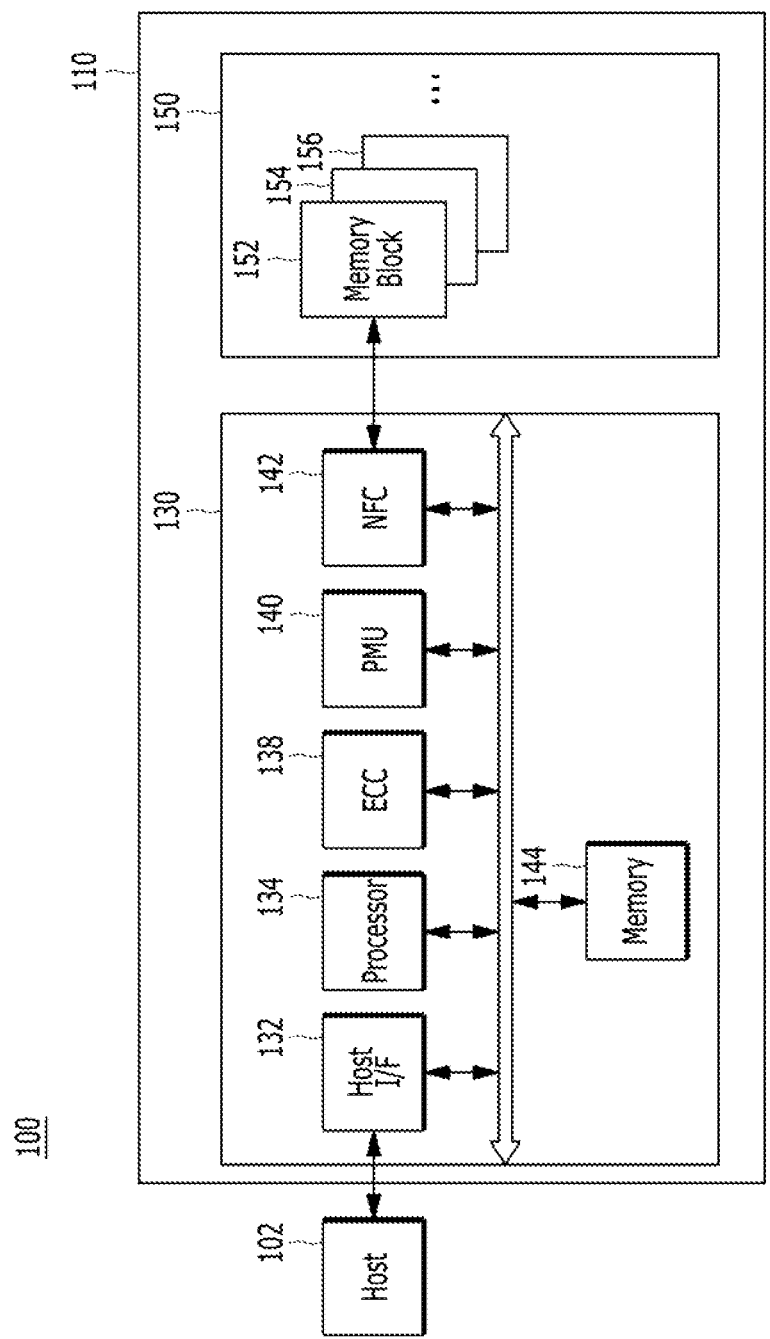
FIG. 1 is a diagram illustrating a data processing system including a memory system, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to" or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described In connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system, according to an embodiment of the present invention.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC) a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as a dynamic random access memory (DRAM) and a static random access memory (SRAM) or a nonvolatile memory device such as a read only memory (ROM), a mask ROM (MROM), a programmable ROM (PROM), an to erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 and a controller 130. The memory device 150 stores data to be accessed by the host 102, and the controller 130 controls data exchange between the memory device 150 and the host 102. That is, under the control of the controller 130, data received from the host may be stored in the memory device 150.

The controller 130 and the memory device 150 may be integrated into one semiconductor device. For instance, the controller 130 and the memory device 150 may be integrated into one semiconductor device to form a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device a black box a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102 during a write operation and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of a word line (WL) are electrically coupled. The memory cells may be single bit cells or multi-bit cells. The memory cells may be arranged in a two or three dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 10 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code a convolution code a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory such as a static random access memory (SRAM) or a dynamic random access memory (DRAM). As described above, the memory 144 may store data used by the host 102 and the memory device 150 for the read and write operations. For such storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be to implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
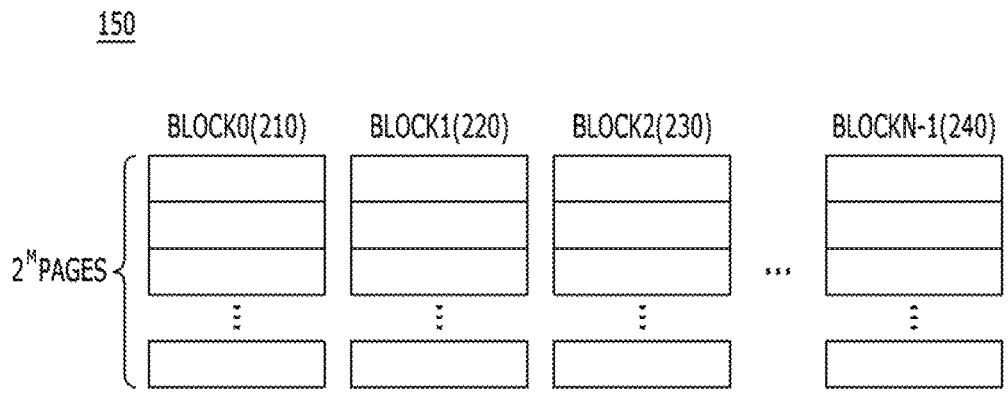
FIG. 2 is a diagram illustrating an example of a memory device employed in the memory system of FIG. 1.

FIG. 2 is a detailed diagram of the memory device 150 shown in FIG. 1.

Referring to FIG. 2, the memory device 150 may include a plurality of memory blocks, for example, a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, $2^M$ number of pages ($2^M$ PAGES). Each of the pages may to include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block, may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
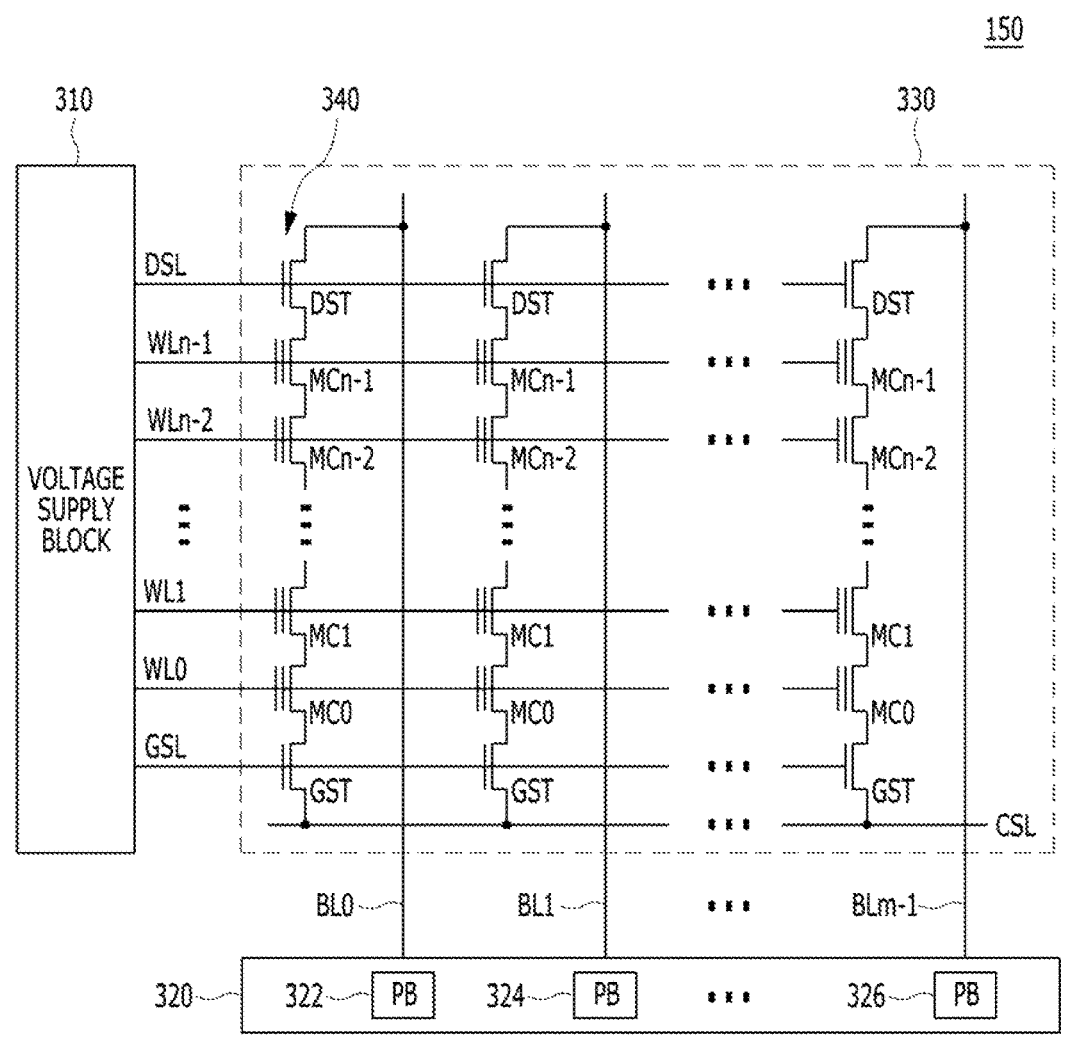
FIG. 3 is a circuit diagram illustrating a memory block in a memory device, according to an embodiment of the present invention.

FIG. 3 is a diagram illustrating a memory device 150 including the memory block shown in FIG. 2 FIG. 3 shows a detailed configuration of a single memory block 330 and circuits related thereto 310 and 320.

Referring to FIG. 3, the memory block 330 may include a plurality of cell strings 340 which are electrically coupled to bit lines BL0 to BLm-1, respectively. The cell string 340 of each column may include at least one drain select transistor (i.e., string select transistor) DST and at least one ground select transistor (i.e., source select transistor) GST. A plurality of memory cell transistors MC0 to MCn-1 may be electrically coupled in series between the select transistors GST and DST. The respective memory cells MC0 to MCn-1 may be configured by multi-level cells (MLC) each of which stores data information of a plurality of bits. The cell strings 340 may be electrically coupled to the corresponding bit lines BL0 to BLm-1, respectively. For reference in FIG. 3, 'DSL' denotes a drain select line (i.e., a string select line), 'GSL' denotes a ground select line (i.e., a source select line), and 'CSL' denotes a common source line.

While FIG. 3 shows, as an example, the memory block 330 which is configured by NAND flash memory cells, is to be noted that the memory block 330 of the memory device 300 according to an exemplary embodiment of the present invention is not limited to NAND flash memory and may be realized by NOR flash memory, hybrid flash memory in which at least two kinds of memory cells are combine d, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a 2-dimensional or 3-dimensional memory device. For example, as shown in FIG. 4, in the case where the memory device 150 is realized as a 3-dimensional nonvolatile memory device, the memory device 150 may include a plurality of memory blocks BLK0 to BLKN-1.

Figure 4:
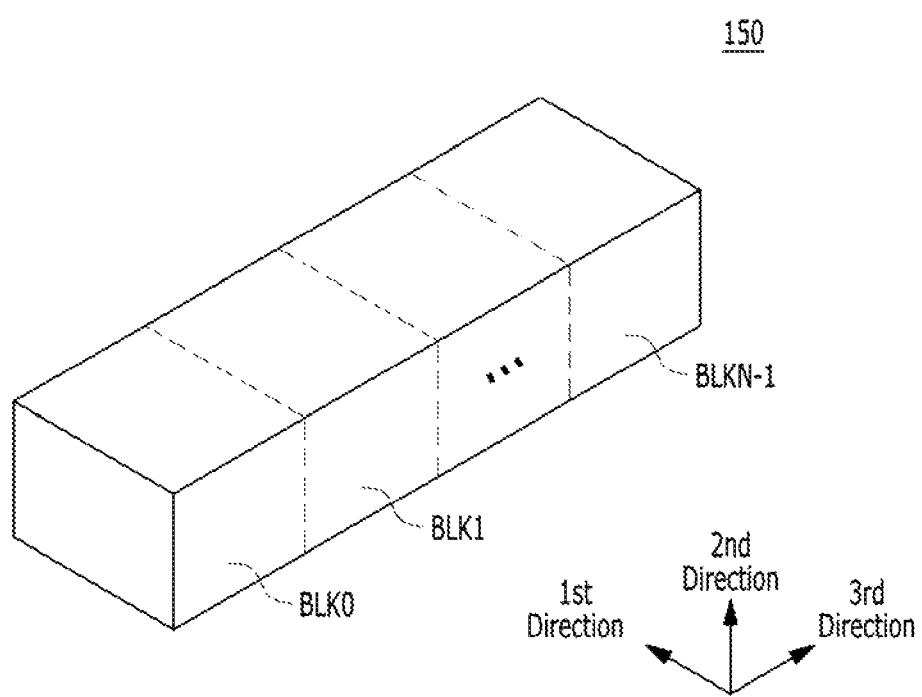
FIG. 4 is a diagram schematically illustrating an example configuration of a memory device, according to an embodiment of the present invention.

FIG. 4 is a block diagram illustrating the memory blocks of the memory device shown in FIG. 3, and the memory blocks BLK0 to BLKN-1 may be realized as a 3-dimensional structure (or a vertical structure). For example, the respective memory blocks BLK0 to BLKN-1 may be realized as a 3-dimensional structure by including a structure which extends in first to third directions (for example, the x-axis direction, the y-axis direction and the z-axis direction).

The respective memory blocks BLK0 to BLKN-1 may include a plurality of NAND strings extending in the second direction. The plurality of NAND strings may be provided in the first direction and the third direction. Each NAND string may be electrically coupled to a bit line, at least one drain select line, at least one ground select line, a plurality of word lines, at least one dummy word line, and a common source line. Namely, the respective memory blocks BLK0 to BLKN-1 may be electrically coupled to a plurality of bit lines, a plurality of drain select lines, a plurality of ground select lines, a plurality of word lines, a plurality of dummy word lines, and a plurality of common source lines.

Hereinbelow, detailed descriptions will be made with reference to FIGS. 5 to 8, for data processing with respect to a memory device 150 in a memory system according to an embodiment of the present invention. Particularly, a command data processing operation corresponding to a command received from the host 102 with respect to the memory device 150 will be described.

Figure 5:
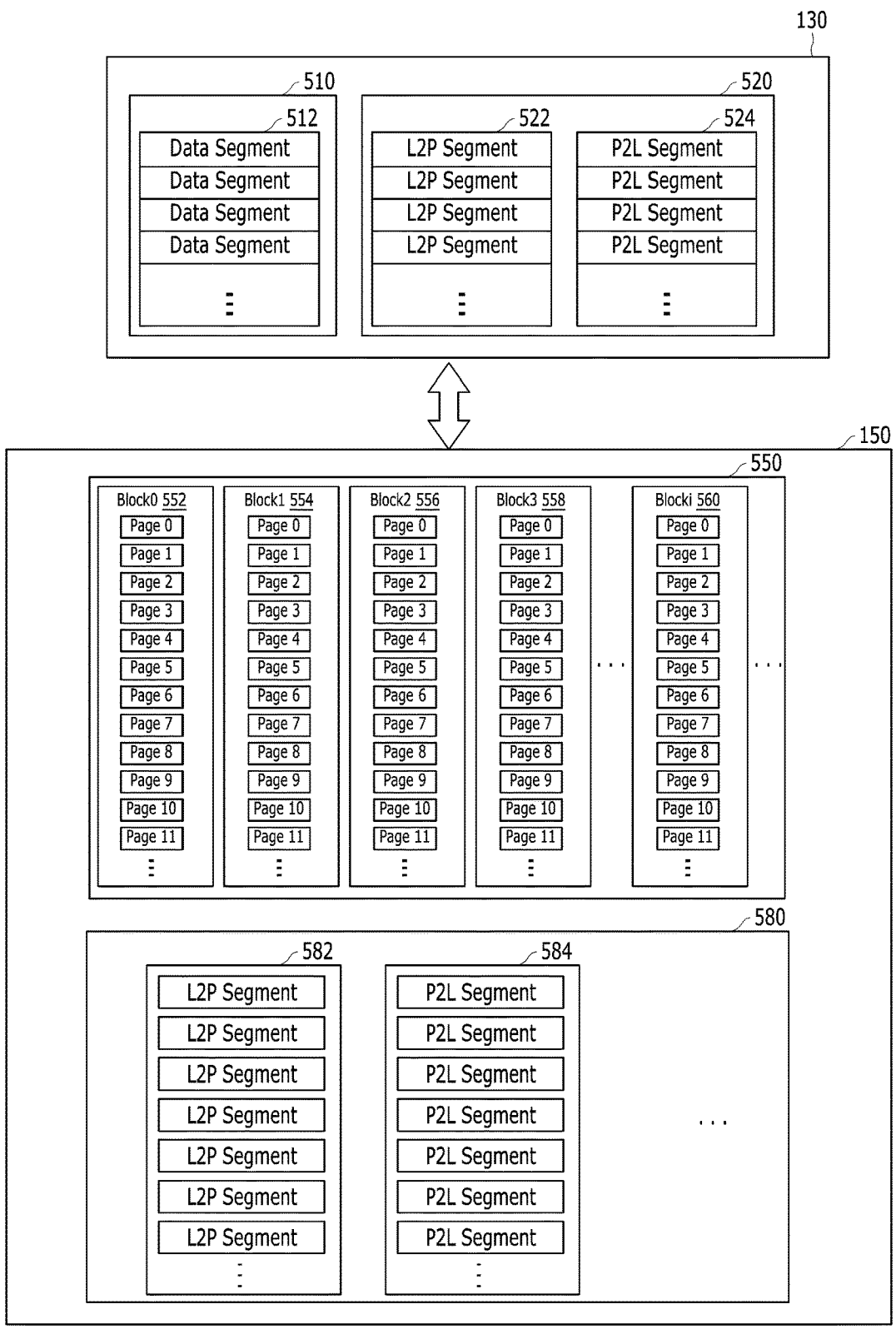
FIGS. 5 to 7 are diagrams schematically illustrating a data processing operation with respect to a memory device in a memory system, according to an embodiment of the present invention.
Figure 6:
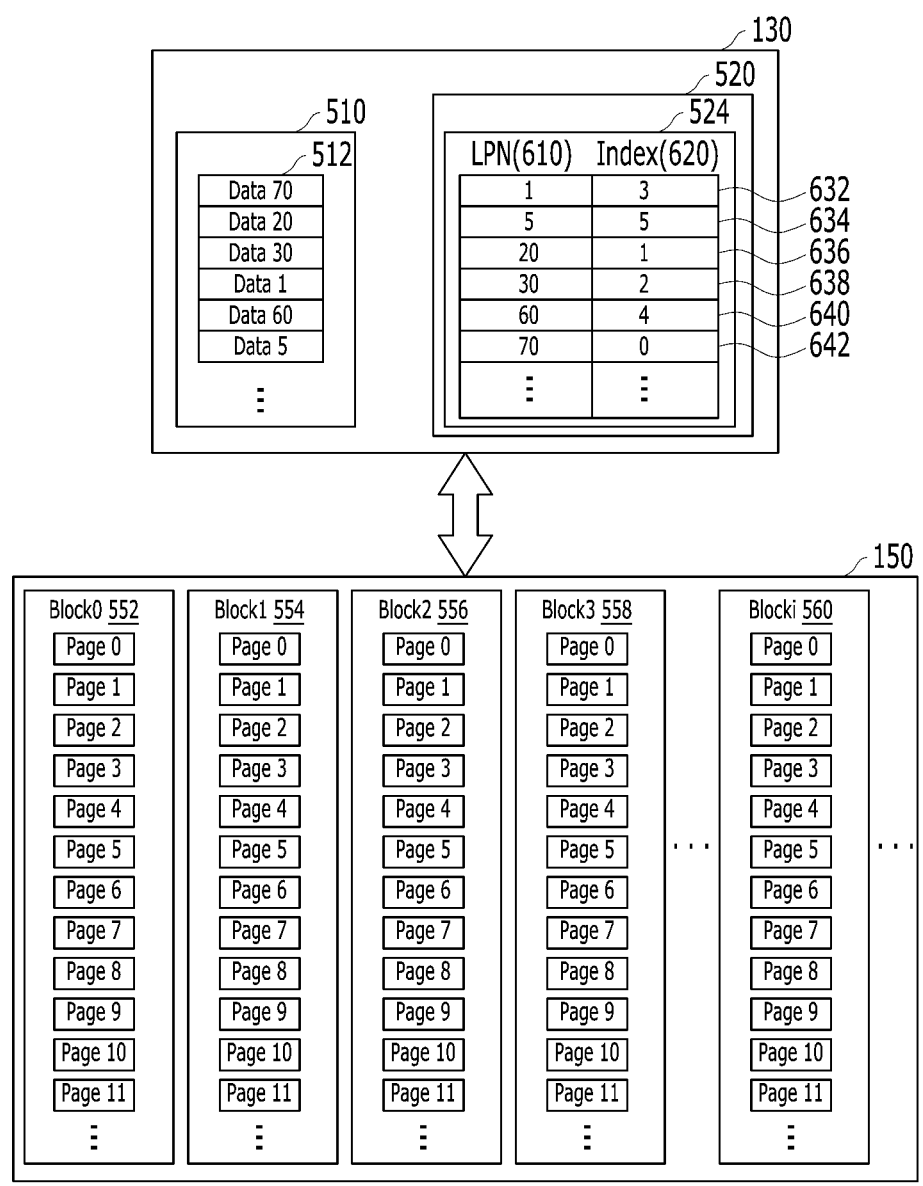
Figure 7:
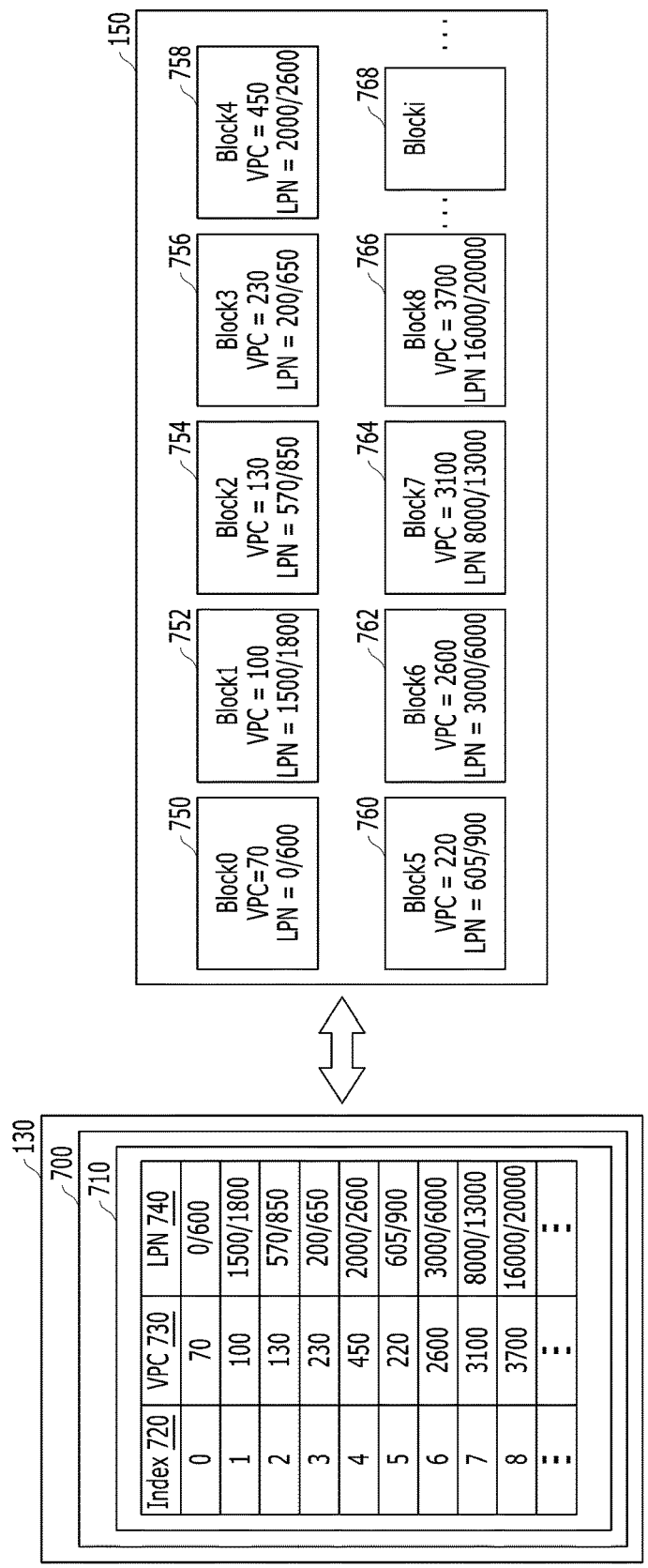

FIGS. 5 to 7 are diagrams illustrating a data processing operation with respect to a memory device in a memory system according to an embodiment of the present invention. Hereinbelow, data processing will be described in the case where, in the memory system 110 shown in FIG. 1, after storing command data corresponding to a command received from the host 102 in the buffer/cache included in the memory 144 of the controller 130, a command operation corresponding to the command received from the host 102 is performed. For example, the write data corresponding to a write command stored in the buffer/cache are written (or programmed) in the plurality of memory blocks included in the memory device 150 and then the data programmed in the memory device 150 are updated and reprogrammed in the memory device 150.

As described below, as an example, the controller 130 may perform a data processing operation in the memory system 110. However, it is to be noted that the processor 134 included in the controller 130 may perform data processing through a flash translation layer (FTL). Moreover, as described below, the data processing operation may be a program operation. The program operation may to be performed by the controller 130. The program operation may include, the controller 130 first storing user data and metadata corresponding to a write command received from the host 102 in a buffer included in the memory 144 of the controller 130. The program operation may further include the controller 130 writing (i.e., storing) the data stored in the buffer, in a plurality of memory blocks included in the memory device 150. For example the controller 130 performs a program operation.

The metadata may include first map data including a logical to physical (L2P) information (hereinafter, also referred to as 'logical information') and second map data including a physical to logical (P2L) information (hereinafter, referred to also as 'physical information'), for data stored in the memory blocks in response to a program operation. The metadata may include information on the command data corresponding to the command received from the host 102, information on the command operation corresponding to the command, information on the memory blocks of the memory device 150 for which the command operation is to be performed and information on map data corresponding to the command operation. In other words, the metadata may include all remaining information and data excluding the user data corresponding to the command received from the host 102.

In an embodiment, when the controller 130 receives a write command from the host 102, the user data corresponding to the write command are stored in the memory blocks of the memory device 150. For example, the user data corresponding to the write command may be stored in open memory blocks for which an erase operation is performed or in free memory blocks among the memory blocks. Metadata may include mapping information between logical addresses and physical addresses for the user data stored in the memory blocks, and mapping information between physical addresses and logical addresses for the memory blocks in which the user data are stored. The former mapping information is first map data including an L2P map table recording logical information. The latter mapping information is second map data including a P2L map table recording physical information. The metadata are stored in the open memory blocks or the free memory blocks among the memory blocks of the memory device 150. For example, in an embodiment, when a write command is received from the host 102, the user data corresponding to the write command are stored in the memory blocks, and metadata including the first map data and the second map data for the user data stored in the memory blocks and so forth are stored in the memory blocks. At this time, data segments of the user data and meta segments of the metadata are stored in the memory blocks of the memory device 150. For example, L2P segments of the first map data and P2L segments of the second map data as map segments of map data are stored in the memory blocks of the memory device 150.

In an embodiment, in the case where a command operation in the memory blocks is performed for user data corresponding to a command received from the host 102, to perform the command operation, first and second map data for the user data stored in the memory blocks are searched and checked. By searching and checking, respective logical segments of the first map data for the user data and respective physical segments of the second map data for the user data, the command operation for the user data in the memory blocks is performed. For example, by scanning the L2P segments of the first map data for the user data and the P2L segments of the second map data for the user data, the command operation for the user data in the memory blocks is performed.

Searching and checking the logical segments of the first map data for the user data and the physical segments of the second map data for the user data, may include sorting the map segments included in the first and second map data according to the logical information. For example, to more quickly and stably perform scanning for the logical segments and the physical segments in the first map data and the second map data, the logical segments and the physical segments included in the first map data and the second map data may be sorted according to logical page numbers (hereinafter referred to as "LPNs") or logical addresses, of the user data. In this way, the first map data and the second map data may be generated. The first map data and the second map data may be stored in the memory blocks of the memory device 150. Then, in the case where the first map data and the second map data are scanned to perform the command operation corresponding to the command received from the host 102, after loading the first map data and the second map data in the map cache or map buffer included in the memory 144 of the controller 130, the scanning for the sorted map segments of the first map data and the second map data may be performed more quickly. For example, the searching and checking for the logical segments and the physical segments may be performed more quickly.

In an embodiment, in the case where the second map data are generated and updated when performing the write command operation corresponding to the write command received from the host 102, the logical addresses of the data written in the pages of the memory blocks, and the P2L segments included in the P2L map table of the second map data are sorted based on LPNs. For example, the LPNs of the user data corresponding to the write command are checked, and the P2L segments included in the P2L map table of the second map data are sorted based on LPNs. In this way, the P2L map table is constructed. For example, the second map data are generated. The second map data in which the P2L segments are sorted based on LPNs as described above are stored in the memory blocks of the memory device 150, and are managed and stored in the map cache or map buffer included in the memory 144 of the controller 130.

In an embodiment, in the case where an update for the first map data and the second map data is performed as the user data corresponding to the write command received from the host 102 are to written in the memory blocks of the memory device 150, the LPNs of the user data written in the memory blocks are checked. Since the first map data and the second map data stored in the memory 144 of the controller 130 are sorted based on LPNs, positions corresponding to the LPNs of the user data written in the memory blocks are checked among the sorted P2L segments, and P2L segments existing at the checked positions are shifted. Particularly, the P2L segments of the second map data are sorted. As the P2L segments corresponding to the user data written in the memory blocks are recorded in empty areas that are generated through the shifting, the second map data are updated. The P2L segments of the updated second map data are also sorted based on LPNs.

Therefore, in an embodiment, in the case of performing searching and checking among the logical segments and the physical segments of the first map data and the second map data to perform a command operation corresponding to a command received from the host 102, since the logical segments and the physical segments of the first map data and the second map data are sorted based on LPNs, the searching and checking among the logical segments and the physical segments of the first map data and the second map data, for the LPNs of the user data corresponding to the command, may be performed more quickly. For example, scanning among the first map data and the second map data for the LPNs of the user data corresponding to the command may be performed more quickly.

In this way, in an embodiment, since the first map data and the second map data are loaded in the memory 144 of the controller 130, scanning for the P2L segments corresponding to the user data corresponding to the command received from the host 102 may be performed more quickly. Particularly, the P2L segments of the second map data are sorted based on LPNs. Accordingly, searching and checking of map data to perform the command operation corresponding to the command received from the host 102 may be performed more quickly. For example, an access speed to map data for performing the command operation is increased, whereby it is possible to more quickly and stably process the command data corresponding to the command received from the host 102.

In an embodiment, a background operation for the memory device 150 may be performed in consideration of the first map data and the second map data sorted based on LPNs as described above. For instance, a background operation may include an operation of processing the data stored in the memory blocks of the memory device 150 by copying them to optional memory blocks. For example, a garbage collection operation, an operation of swapping the memory blocks of the memory device 150 or the data stored in the memory blocks (for example a wear leveling operation) may be performed. An operation of storing the map data stored in the controller 130, in the memory blocks of the memory device 150 (for example a map flush operation) may be performed.

In an embodiment, after the controller 130 stores the write data corresponding to the write command received from the host 102, in the buffer included in the memory 144 of the controller 130, the controller 130 programs the data stored in the buffer, in the plurality of pages of an optional memory block among the plurality of memory blocks included in the memory device 150. For example the controller 130 performs a program operation and stores the data stored in the buffer, m the first page of a first memory block. In the case where the controller 130 receives a write command for the data stored in the first page of the first memory block, from the host: 102, the controller 130 performs program for the data stored in the first page of the first memory block. In other words, the controller 130 stores write data corresponding to the write command received from the host 102, in other pages of the optional memory block, or the pages of another optional memory block. For example, the controller 130 stores the write data corresponding to the write command the second page of the first memory block, or the first page of a second memory block. At this time, the data stored in the page of the previous optional memory block is processed as invalid data. For example, the first page of the first memory block is processed as invalid data and accordingly, the first page of the first memory block becomes an invalid page.

In an embodiment, in the case where invalid pages are included in the memory blocks of the memory device 150 in this way, for maximizing the utilization efficiency of the memory device 150, an operation of processing data among the memory blocks of the memory device 150 may be performed. For example, a garbage collection operation may be performed as a background operation. In an embodiment, checks closed memory blocks that is, memory blocks in which operations for writing data in all the pages included in the memory blocks have been performed, among the memory blocks of the memory device 150, and also the number of invalid pages in the closed memory blocks. The controller 130 then performs an operation of copying and storing the data of the valid pages included in memory blocks, that is, valid data, to and in empty memory blocks, open memory blocks or free memory blocks, that is, a garbage collection operation for the memory blocks of the memory device 150.

Namely, in an embodiment, in consideration of memory blocks in which operations for writing data in all the pages included in each memory block have been performed, among the memory blocks of the memory device 150, and in consideration of invalid pages in dosed memory blocks in which program of data has been performed, the controller 130 performs an operation of copying and storing the data of the valid pages included in memory blocks to and in memory blocks for which program is not performed. For example, the controller 130 performs the operation of copying and storing the valid data to and in empty memory blocks, open memory blocks or free memory blocks. For example, the controller 130 performs a garbage collection operation for the memory blocks of the memory device 150.

In this regard, in an embodiment, the controller 130 may check valid pages in the memory blocks of the memory device 150 and perform the garbage collection operation according to one or more parameters of the memory blocks, and may thereby generate empty memory blocks, open memory blocks or free memory blocks. For example, the parameters may include valid page counts (VPCs) of the memory blocks. For example in an embodiment detailed descriptions will be made for data processing in the case where the garbage collection operation is performed for the memory blocks of the memory device 150, in consideration of not only the parameters but also the first map data and the second map data sorted based on LPNs as described above, in the closed memory blocks of the memory device 150. For example, in an embodiment, in the memory blocks included in the memory device 150, in consideration of the parameters in the closed memory blocks, for example, the VPCs of the closed memory blocks, the first map data and the second map data sorted based on LPNs source memory blocks are selected among the memory blocks. Then, valid data in the source memory blocks are copied and stored to and in target memory blocks, and an erase operation is performed for the source memory blocks. For example, the target memory blocks may include empty memory blocks, open memory blocks or free memory blocks in which programming of data for all the pages included in each memory block is not performed. Accordingly, the garbage collection operation of generating the source memory blocks into empty to memory blocks, open memory blocks or free memory blocks is performed. Hereinbelow, a data processing operation in the memory system according to an embodiment will be described in detail with reference to FIGS. 5 to 7.

First, referring to FIG. 5, the controller 130 writes and stores data corresponding to a command received from the host 102, for example, user data corresponding to a write command, in open memory blocks 552, 554, 556, 558 and 560 of a data memory block 550 among the memory blocks of the memory device 150. For example, the controller 130 writes and stores user data corresponding to a write command in open memory blocks 552, 554, 556, 558 and 560 of the data memory block 550. In response to the write operation to the data memory block 550, the controller 130 stores map data for the user data, in open memory blocks 582 and 584 of a map memory block 580 among the memory blocks of the memory device 150.

The controller 130 stores information indicating that the user data are stored in the pages included in the open memory blocks 552, 554, 556, 558 and 560 of the data memory block 550 in the memory device 150 in the open memory blocks 582 and 584 included in the map memory block 580 of the memory device 150. For example, the information indicating that the user data are stored in the pages included in the open memory blocks 552, 554, 556, 558 and 560 of the data memory block 550 in the memory device 150 may include first map data and second map data. In other words, the controller 130 stores the logical segments (For example, L2P segments) of the first map data, in the first memory block 582 of the map memory block 580, and stores the physical segments (For example, P2L segments) of the second map data, in the second memory block 584 of the map memory block 580.

Furthermore, the controller 130 caches and buffers the data corresponding to the command received from the host 102, for example, the user data corresponding to the write command, in a first buffer 510 included in the memory 144 of the controller 130. For example, stores data segments 512 of the user data in the first buffer 510 as a data buffer/cache. For example, the controller 130 caches and buffers the user data corresponding to the write command in the first buffer 510 included in the memory 144 of the controller 130. For example, the controller 130 stores data segments 512 of the user data in the first buffer 510 as a data buffer/cache. Then, the controller 130 writes and stores the data segments 512 stored in the first buffer 510, in the pages of the open memory blocks 552, 554, 556, 558 and 560 included in the data memory block 550 of the memory device 150.

As the data segments 512 of the user data corresponding to the command received from the host 102 are stored in the pages of the open memory blocks 552, 554, 556, 558 and 560 included in the data memory block 550 of the memory device 150, the controller 130 generates the first map data and the second map data, and stores the first map data and the second map data in a second buffer 520 included in the memory 144 of the controller 130. Namely, the controller 130 stores L2P segments 522 of the first map data for the user data and P2L segments 524 of the second map data for the user data, in the second buffer 520 as a map buffer/cache.

In the second buffer 520 of the memory 144 of the controller 130 there may be stored, as described above, the L2P segments 522 of the first map data and the P2L segments 524 of the second map data. Alternatively, there may be stored a map list for the L2P segments 522 of the first map data and a map list for the P2L segments 524 of the second map data. In this case, the L2P segments 522 of the first map data and the P2L segments 524 of the second map data are stored in the second buffer 520 by being sorted in the sequence of LPNs. Alternatively, indexes indicating map segments in the map lists are stored in the second buffer 520 by being sorted in the sequence of LPNs. Hereinafter, for the sake of convenience in explanation, detailed descriptions will be made for the case where the L2P segments 522 of the first map data and the P2L segments 524 of the second map data are stored in the second buffer 520 by being sorted in the sequence of LPN. However, it is to be noted that the present embodiment may be applied in the same manner to the case where the indexes indicating the map segments in the map lists are stored in the second buffer 520 by being sorted in the sequence of LPNs.

The controller 130 stores the L2P segments 522 of the first map data and the P2L segments 524 of the second map data which are stored in the second buffer 520, in the first memory block 582 and the second memory block 584 in the map memory block 580 of the memory device 150, respectively. In addition, in the case of performing scanning in the first map data and the second map data for the user data corresponding to the command to perform the command operation corresponding to the command received from the host 102, the controller 130 performs scanning in the L2P segments 522 of the first map data and the P2L segments 524 of the second map data stored in the second buffer 520. Alternatively, the controller 130 loads the L2P segments of the first map data and the P2L segments of the second map data stored in the first memory block 582 and the second memory block 584 in the map memory block 580 of the memory device 150, in the second buffer 520, and then performs scanning in the L2P segments 522 of the first map data and the P2L segments 524 of the second map data loaded in the second buffer 520. Hereinbelow, it will be described in detail as an example, for the sake of convenience in explanation that the data segments 512 of the user data corresponding to the command received from the host 102 are stored in the memory block 0 552 among the memory blocks of the memory device 150.

Referring to FIG. 6, when the command (for example the write command) is received from the host 102, the controller 130 stores the data segments 512 of the user data corresponding to the write command, in the first buffer 510 included in the memory 144 of the controller 130. For example, the controller 130 stores, in the first buffer 510, a data segment having a logical page number 70 (hereinafter, referred to as "data 70"), a data segment having a logical page number 20 (hereinafter, referred to as "data 20"), a data segment having a logical page number 30 (hereinafter, referred to as "data 30"), a data segment having a logical page number 1 (hereinafter, referred to as data 1"),a data segment having a logical page number 60 (hereinafter, referred to as "data 60") and a data segment having a logical page number 5 (hereinafter, referred to as data "5").

The controller 130 writes and stores the data segments 512 of the user data stored in the first buffer 510, in the pages included in the memory block 0 552 of the memory device 150. Among the data segments 512 of the user data stored in the first buffer 510, the controller 130 stores the data 70 in a page 0 of the memory block 0 552, stores the data 20 in a page 1 of the memory block 0 552, stores the data 30 in a page 2 of the memory block 0 552, stores the data 1 in a page 3 of the memory block 0 552, stores the data 60 in a page 4 of the memory block 0 552, and stores the data 5 in a page 5 of the memory block 0 552.

The controller 130 generates information indicating that the data segments 512 of the user data are stored in the pages included in the memory block 0 552 of the memory device 150. For example, the controller 130 generates the P2L segments 524 of the second map data Then, the controller 130 stores the P2L segments 524 of the second map data in the second buffer 520, by sorting them based on LPNs.

In detail, in the P2L map table of the second map data in which indexes 620 indicating physical addresses for LPNs 610 are recorded, the controller 130 generates a P2L segment 642 (hereinafter, referred to as a "P2L segment 70") indicating that the data 70 is stored in the page 0 of the memory block 0 552, a P2L segment 636 (hereinafter, referred to as a "P2L segment 20") indicating that the data 20 is stored in the page 1 of the memory block 0 552, a P2L segment 638 (hereinafter, referred to as a "P2L segment 30") indicating that the data 30 is stored in the page 2 of the memory block 0 552, a P2L segment 632 (hereinafter, referred to as a "P2L segment 1") indicating that the data 1 is stored in the page 3 of the memory block 0 552, a P2L segment 640 (hereinafter, referred to as a "P2L segment 60") indicating that the data 60 is stored in the page 4 of the memory block 0 552, and a P2L segment 634 (hereinafter, referred to as a "P2L segment 5") indicating that the data 5 is stored in the page 5 of the memory block 0 552. In other words, the controller 130 generates the P2L segments 524 of the second map data indicating that the data segments 512 of the user data are stored in the pages included in the memory block 0 552 of the memory device 150. For example, the controller 130 generates the P2L segment 70 642, the P2L segment 20 636, the P2L segment 30 638, the P2L segment 1 632, the P2L segment 60 640 and the P2L segment 5 634.

The controller 130 generates the second map data by sorting, based on LPNs, the P2L segments 524 of the second map data generated in this way. For example, the controller 130 generates the P2L segment 70 642, the P2L segment 20 636, the P2L segment 30 638, the P2L segment 1 632, the P2L segment 60 640 and the P2L segment 5 634. For example, the controller 130 generates the second map data by sorting the P2L segment 1 632, the P2L segment 5 634, the P2L segment 20 636, the P2L segment 30 638, the P2L segment 60 640 and the P2L segment 70 642 in that sequence according to LPNs in the P2L map table of the second map data. The controller 130 manages and stores the second map data in which the P2L segments 524 are sorted in this way, in the second buffer 520 and stores the second map data in the second memory block 584 included in the map memory block 580 of the memory device 150. Hereinbelow, performing of a garbage collection operation for the memory blocks of the memory device 150 in the memory system according to the embodiment will be described in detail with reference to FIG. 7.

Referring to FIG. 7, as aforementioned, the controller 130 stores write data corresponding to a write command received from the host 102, in the buffer included in the memory 144 of the controller 130, and programs the data stored in the buffer, in the plurality of memory blocks included in the memory device 150. For example, the controller 130 programs the data stored in the buffer, in corresponding optional memory blocks among a memory block 0 750, a memory block 1 752, a memory block 2 754, a memory block 3 756, a memory block 4 758, a memory block 5 760, a memory block 6 762, a memory block 7 764, a memory block 8 766 and a memory block 1 768.

Each of the plurality of memory blocks included in the memory device 150 includes a plurality of pages, as described above. In an embodiment, in the case of update-programming the data stored in the memory blocks of the memory device 150, the controller 130 checks valid pages in memory blocks corresponding to update programming, and valid page counts (VPCs) indicating the numbers of valid pages in the memory blocks are included in a list. For example, the controller 130 records, in the list, the VPCs of the memory blocks by indexes indicating the memory blocks of the memory device 150, and stores the list in the memory 144 of the controller 130. The controller 130 performs garbage collection in consideration of the VPCs by the memory blocks recorded in the list. For example, the controller 130 selects source memory blocks among the memory blocks of the memory device 150 in consideration of VPCs by the memory blocks recorded in the list, copies the valid data of the source memory blocks to target memory blocks, performs an erase operation for the source memory blocks, and generates thereby the source memory blocks as empty memory blocks, open memory blocks or free memory blocks.

In an embodiment, as aforementioned, the controller 130 generates map data in response to storage of data in the memory blocks of the memory device 150. For example, the controller 130 generates the P2L segments of second map data. Then, the controller 130 sorts the P2L segments of the second map data, based on LPNs. The controller 130 selects source memory blocks among the memory blocks of the memory device 150 by checking correlations among the respective memory blocks through the sorted P2L segments, copies the valid data of the source memory blocks to target memory blocks, performs an erase operation for the source memory blocks, and generates thereby the source memory blocks as empty memory blocks, open memory blocks or free memory blocks.

Hereinbelow, for the sake of convenience in explanation detailed descriptions will be made for a data processing operation according to the embodiment, by taking an example that the memory block 0 750, the memory block 1 752, the memory block 2 754, the memory block 3 756, the memory block 4 758, the memory block 5 760, the memory block 6 762, the memory block 7 764 and the memory block 8 766 of the memory device 150 are closed memory blocks and the memory block 1 768 is a target memory block.

In detail, the controller 130 checks valid pages in the dosed memory blocks among the plurality of memory blocks included in the memory device 150. For example, the controller 130 checks valid pages in the memory block 0 750, the memory block 1 752, the memory block 2 754, the memory block 3 756, the memory block 4 758, the memory block 5 760, the memory block 6 762, the memory block 7 764 and the memory block 8 766. Then, the controller 130 generates a list 710 by recording, in the list 710, VPCs 730 of the memory block 0 750, the memory block 1 752, the memory block 2 754, the memory block 3 756, the memory block 4 758, the memory block 5 760, the memory block 6 762, the memory block 7 764 and the memory block 8 766, by indexes 720 indicating the memory block 0 750, the memory block 1 752, the memory block 2 754, the memory block 3 756, the memory block 4 758, the memory block 5 760, the memory block 6 762, the memory block 7 764 and the memory block 8 766. Later, the controller 130 stores the list 710 in a buffer 700 which is included in the memory 144 of the controller 130.

For example, in the list 710, there are recorded the VPC 730 of 70 for the Index 720 of 0 of the memory block 0 750 indicating that: the VPC of the memory block 0 750 is 70 (VPC=70). The VPC 730 of 100 for the index 720 of 1 of the memory block 1 752 indicates that the VPC of the memory block 1 752 is 100 (VPC=100). The VPC 730 of 130 for the index 720 of 2 of the memory block 2 754 indicates that the VPC of the memory block 2 754 is 130 (VPC=130). The VPC 730 of 230 for the index 720 of 3 of the memory block 3 756 indicates that the VPC of the memory block 3 756 is 230 (VPC=230). The VPC 730 of 450 for the index 720 of 4 of the memory block 4 758 indicates that the VPC of the memory block 4 758 is 450 (VPC=450). The VPC 730 of 220 for the index 720 of 5 of the memory block 5 760 indicates that the VPC of the memory block 5 760 is 220 (VPC=220). In addition, in the list 710, there are recorded the VPC 730 of 2600 for the index 720 of 6 of the memory block 6 762 indicating that the VPC of the memory block 6 762 is 2600 (VPC=2600). The VPC 730 of 3100 for the index 720 of 7 of the memory block 7 764 indicates that the VPC of the memory block 7 764 is 3100 (VPC=3100). The VPC 730 of 3700 for the index 720 of 8 of the memory block 8 766 indicates that the VPC of the memory block 8 766 is 3700 (VPC=3700).

The controller 130 checks the map segments of map data. For example, the P2L segments of second map data, sorted according to the sequence of LPNs, in the closed memory blocks among the plurality of memory blocks included in the memory device 150. For example, the controller 130 checks the P2L segments of second map data, sorted according to the sequence of LPNs, in the memory block 0 750, the memory block 1 752, the memory block 2 754, the memory block 3 756, the memory block 4 758, the memory block 5 760, the memory block 6 762, the memory block 7 764 and the memory block 8 766. Thereby, the controller 130 checks correlations among the memory block 0 750, the memory block 1 752, the memory block 2 754, the memory block 3 756, the memory block 4 758, the memory block 5 760, the memory block 6 762, the memory block 7 764 and the memory block 8 766. The controller 130 checks, through the P2L segments of the second map data, the LPNs 740 of the data segments stored in the memory block 0 750, the memory block 1 752, the memory block 2 754, the memory block 3 756, the memory block 4 758, the memory block 5 760, the memory block 6 762, the memory block 7 764 and the memory block 8 766, by the indexes 720 indicating the memory block 0 750, the memory block 1 752, the memory block 2 754, the memory block 3 756, the memory block 4 758, the memory block 5 760, the memory block 6 762, the memory block 7 764 and the memory block 8 766. For example, the controller 130 checks minimum LPNs and maximum LPNs of the data segments stored in the respective memory blocks, and records the LPNs 740 in the list 710, For example, in the list 710, there are recorded the LPN 740 of 0/600 for the index 720 of 0 of the memory block 0 750 indicating that the minimum LPN/maximum LPN of the memory block 0 750 is 0/600 (LPN=0/600). The LPN 740 of 1500/1800 for the index 720 of 1 of the memory block 1 752 indicates that the minimum LPN/maximum LPN of the memory block 1 752 is 1500/1800 (LPN=1500/1800). The LPN 740 of 570/850 for the index 720 of 2 of the memory block 2 754 indicates that the minimum LPN/maximum LPN of the memory block 2 754 is 570/850 (LPN=570/850). The LPN 740 of 200/650 for the index 720 of 3 of the memory block 3 756 indicates that the minimum LPN/maximum LPN of the memory block 3 756 is 200/650 (LPN=200/650). The LPN 740 of 2000/2600 for the index 720 of 4 of the memory block 4 758 indicates that the minimum LPN/maximum LPN of the memory block 4 758 is 2000/2600 (LPN=2000/2600). The LPN 740 of 605/900 for the index 720 of 5 of the memory block 5 760 indicates that the minimum LPN/maximum LPN of the memory block 5 760 is 605/900 (LPN=605/900). In addition, in the list 710, there are recorded the LPN 740 of 3000/6000 for the index 720 of 6 of the memory block 6 762 indicating that the minimum LPN/maximum LPN of the memory block 6 762 is 3000/6000 (LPN=3000/6000). The LPN 740 of 8000/13000 for the index 720 of 7 of the memory block 7 764 indicates that the minimum LPN/maximum LPN of the memory block 7 764 is 8000/13000 (LPN=8000/13000). The LPN 740 of 16000/20000 for the index 720 of 8 of the memory block 8 766 indicates that the minimum LPN/maximum LPN of the memory block 8 766 is 16000/20000 (LPN=16000/20000).

In the case of performing garbage collection for the closed memory blocks of the memory device 150, including the memory block 0 750, the memory block 1 752, the memory block 2 754, the memory block 3 756, the memory block 4 758, the memory block 5 760, the memory block 6 762, the memory block 7 764 and the memory block 8 766, the controller 130 performs the garbage collection by checking parameters for the memory block 0 750, the memory block 1 752, the memory block 2 754, the memory block 3 756, the memory block 4 758, the memory block 5 760, the memory block 6 762, the memory block 7 764 and the memory block 8 766 For example, the controller 130 performs a garbage collection operation by checking the VPCs 730 and the LPNs 740 of the memory block 0 750, the memory block 1 752, the memory block 2 754, the memory block 3 756, the memory block 4 758, the memory block 5 760, the memory block 6 762, the memory block 7 764 and the memory block 8 766, from the list 710 stored in the buffer 700 of the controller 130.

To perform the garbage collection for the closed memory blocks to included in the memory device 150, the controller 130 selects source memory blocks among the closed memory blocks included in the memory device 150, in consideration of the VPCs and correlations of the closed memory blocks. Hereinbelow, for the sake of convenience in explanation, detailed descriptions will be made by taking an example that the controller 130 selects source memory blocks in consideration of the VPCs and correlations of the memory block 0 750, the memory block 1 752, the memory block 2 754, the memory block 3 756, the memory block 4 758, the memory block 5 760 the memory block 6 762, the memory block 7 764 and the memory block 8 766. Hereinbelow, an example will be described where a threshold VPC for a source memory block among the closed memory blocks included in the memory device 150 is set to 1500.

The controller 130 checks the VPCs 730 of the memory block 0 750, the memory block 1 752, the memory block 2 754, the memory block 3 756, the memory block 4 758, the memory block 5 760, the memory block 6 762, the memory block 7 764 and the memory block 8 766 from the list 710 stored in the buffer 700. Thereby, the controller 130 selects source memory blocks among the memory block 0 750, the memory block 1 752, the memory block 2 754, the memory block 3 756, the memory block 4 758, the memory block 5 760, the memory block 6 762, the memory block 7 764 and the memory block 8 766. Since, as aforementioned, the threshold VPC for a source memory block among the closed memory blocks included in the to memory device 150 is 1500, the controller 130 may select, as source memory blocks, memory blocks having VPCs less than the threshold VPC among the memory block 0 750, the memory block 1 752, the memory block 2 754, the memory block 3 756, the memory block 4 758, the memory block 5 760, the memory block 6 762, the memory block 7 764 and the memory block 8 766. For example, the controller 130 may select, as the source memory blocks the memory block 0 750, the memory block 1 752, the memory block 2 754, the memory block 3 756, the memory block 4 758 and the memory block 5 760.

The controller 130 then checks correlations among the memory block 0 750, the memory block 1 752, the memory block 2 754, the memory block 3 756, the memory block 4 758, the memory block 5 760, the memory block 6 762, the memory block 7 764 and the memory block 8 766, through the LPNs 740 of the memory block 0 750, the memory block 1 752, the memory block 2 754, the memory block 3 756, the memory block 4 758, the memory block 5 760, the memory block 6 762, the memory block 7 764 and the memory block 8 766, from the list 710 stored in the buffer 700. For example, the controller 130 checks minimum LPN s and maximum LPNs for the data segments stored in the memory block 0 750, the memory block 1 752, the memory block 2 754, the memory block 3 756, the memory block 4 758, the memory block 5 760, the memory block 6 762, the memory block 7 764 and the memory block 8 766, through the LPNs 740 of the memory block 0 750, the memory block 1 752, the memory block 2 754, the memory block 3 756, the memory block 4 758, the memory block 5 760, the memory block 6 762, the memory block 7 764 and the memory block 8 766, from the list 710 stored in the buffer 700. The controller 130 checks correlations among the respective memory blocks through minimum LPNs and maximum LPNs in the memory block 0 750, the memory block 1 752, the memory block 2 754, the memory block 3 756, the memory block 4 758, the memory block 5 760, the memory block 6 762, the memory block 7 764 and the memory block 8 766.

When making detailed descriptions by taking an example the controller 130 may check correlations between an optional memory block among the memory block 0 750, the memory block 1 752, the memory block 2 754, the memory block 3 756 the memory block 4 758, the memory block 5 760, the memory block 6 762, the memory block 7 764 and the memory block 8 766. For example, the controller 130 may check correlations between the memory block 0 750 having the minimum VPC and the other memory blocks, and select, as additional source memory blocks, one or more memory blocks having an overlay and/or sequence with respect to the LPN 740 of 0/600 of the memory block 0 750.

For example, since it is checked, through the LPNs 740 of the memory block 0 750, the memory block 1 752, the memory block 2 754, the memory block 3 756, the memory block 4 758, the memory block 5 760, the memory block 6 762, the memory block 7 764 and the memory block 8 766, that the LPN 740 of 0/600 of the memory block 0 750 and the LPN 740 of 200/650 of the memory block 3 756 have the largest and next largest overlay, the controller 130 checks the memory block 0 750 and the memory block 3 756 as memory blocks having a large correlation. Accordingly, the controller 130 selects the memory block 0 750 and the memory block 3 756 as source memory blocks. The controller 130 may additionally select the memory block 2 754 as a source memory block since the LPN 740 of 0/600 of the memory block 0 750 and the LPN 740 of 570/850 of the memory block 2 754 which also have an overlay. The controller 130 may additionally select the memory block 5 760 as a source memory block since the LPN 740 of 570/850 of the memory block 2 754 and the LPN 740 of 605/900 of the memory block 5 760 have an overlay as well.

Furthermore, since it is checked, through the LPNs 740 of the memory block 0 750, the memory block 1 752, the memory block 2 754, the memory block 3 756, the memory block 4 758, the memory block 5 760, the memory block 6 762, the memory block 7 764 and the memory block 766, that the LPN 740 of 0/600 of the memory block 0 750 and the LPN 740 of 605/900 of the memory block 5 760 have a largest sequence, the controller 130 checks the memory block 0 750 and the memory block 5 760 as memory blocks having a large correlation. Accordingly, the controller 130 selects the memory block 0 750 and the memory block 5 760 as source memory blocks.

The controller 130 checks, through the LPNs 740 of the memory block 0 750, the memory block 1 752, the memory block 2 754, the memory block 3 756, the memory block 4 758, the memory block 5 760, the memory block 6 762, the memory block 7 764 and the memory block 8 766, correlations among the memory block 0 750, the memory block 1 752, the memory block 2 754, the memory block 3 756, the memory block 4 758, the memory block 5 760, the memory block 6 762, the memory block 7 764 and the memory block 8 766. For example, the controller 130 checks overlays and sequences of LPNs for the data segments stored in the respective memory blocks. Then the controller 130 selects source memory blocks in response to the overlays and sequences among the respective memory blocks, and performs a garbage collection operation for the source memory blocks.

Namely, the controller 130 checks the valid pages included in the source memory blocks selected according to correlations among the respective memory blocks. For example, as the source memory blocks, the memory block 0 750 and the memory block 3 756 are selected according to the LPN overlays of the respective memory blocks, the memory block 2 754 and the memory block 5 760 are selected additionally, and the memory block 0 750 and the memory block 5 760 are selected according to the LPN sequences of the respective memory blocks. Thereafter, the controller 130 copies and stores the valid data stored in the valid pages of the memory block 0 750, the memory block 3 756, the memory block 2 754 and the memory block 5 760, to and in a target memory block. For example, the controller 130 stores the valid data in an empty memory block, an open memory block or a free memory block. For example, the controller 130 stores the valid data in the memory block 1 768. Then, the controller 130 performs an erase operation for the memory block 0 750, the memory block 3 756, the memory block 2 754 and the memory block 5 760 as source memory blocks, and generates the source memory blocks as empty memory blocks, open memory blocks or free memory blocks.

In the case where the valid data stored in the valid pages of the memory block 0 750, the memory block 3 756, the memory block 2 754 and the memory block 5 760 as source memory blocks are copied and stored to and in the memory block 1 768 as a target memory block, the valid data stored in the valid pages of the memory block 0 750, the memory block 3 756, the memory block 2 754 and the memory block 5 760 are sorted according to LPNs, and sorted data segments are copied and stored to and in the memory block 1 768. The controller 130 generates map data in response to the storage of the data segments in the memory block 1 768, sorts the map segments of the generated map data according to LPNs, and stores the sorted map segments in the map memory block 580. For example, the controller 130 stores the data segments stored in the memory block 0 750 the memory block 3 756, the memory block 2 754 and the memory block 5 760, in the memory block 1 768 as a target memory block. In the memory block 1 768, the data segments sorted according to LPNs are stored. In other words, data segments from the data segment having the minimum LPN of 0 to the data segment having the maximum LPN of 900 are sorted according to LPNs and are then stored, As described above, in the memory system according to the embodiment, map data for command data corresponding to a command received from the host 102 are sorted according to LPNs. For example, the map data may be the P2L segments of second map data. Then, the map data are stored and managed in, as the map cache, the second buffer 520, included in the memory 144 of the controller 130 and the memory blocks of the memory device 150. For example in the case of searching and checking map data to perform a command operation corresponding to the command received from the host 102, searching and checking map data in the map data may be quickly performed. For example, in the case of searching and checking (For example, scanning) the logical segments and physical segments of map data, scanning in the segments of the map data may be quickly performed. For example, map segments corresponding to the command received from the host 102 among the P2L segments of the second map data, as the P2L segments of the second map data are sorted according to the sequence of LPNs and are stored and managed in the second buffer 520 of the controller 130 and the memory blocks of the memory device 150, scanning in the P2L segments of the second map data may be quickly performed. As a result, the command data corresponding to the command received from the host 102 may be quickly processed, and the command operation corresponding to the command received from the host 102 may be quickly performed. Further, in the memory system according to the embodiment, since source memory blocks are selected by checking correlations among the memory blocks of the memory device 150 through LPNs sorted as aforementioned, source memory blocks may be selected efficiently. Accordingly, by performing a garbage collection operation for the source memory blocks selected in this way, the utilization efficiency of the memory blocks included in the memory device 150 may be possibly maximized. Hereinbelow, an operation for processing data in a memory system according to an embodiment will be described below in detail with reference to FIG. 8.

Figure 8:
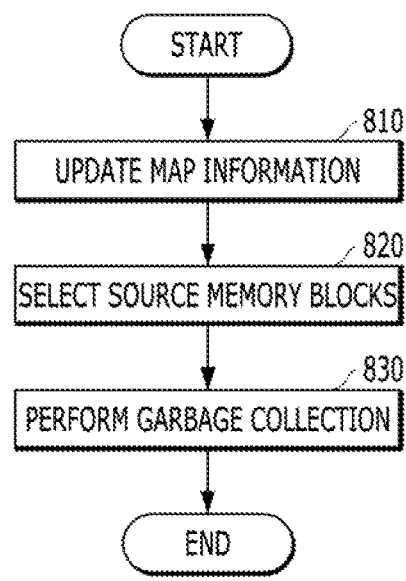
FIG. 8 is a flow chart illustrating an operation process for processing data in a memory system according to an embodiment of the present invention.

FIG. 8 is a flow chart illustrating an operation for processing data in a memory system according to an embodiment of the present invention.

Referring to FIG. 8, in a memory system, at step 810, in the case where a write command for the data stored in the memory blocks of a memory device is received from a host, data corresponding to the write command are programmed and stored in other optional memory blocks among the memory blocks of the memory device. For example, an update program operation is performed. Then, map information for the memory blocks are updated according to the update program. In this regard, as aforementioned, the map information for the memory blocks may be updated by being sorted according to LPNs. For example, map segments are updated by being sorted according to LPNs Then, at step 820, one or more source memory blocks are selected. The source memory blocks may be selected by checking the VPCs, minimum LPNs and maximum LPNs for each one of the closed memory blocks of the memory device. For example, a closed memory block having the smaller the VPC among the closed memory blocks may be selected as a first source memory block. Alternatively, at least one closed memory block having a VPC less than a preset threshold value may be selected as a first source memory block. Then at least one additional memory block may be selected among the closed memory blocks as an additional source memory block based on a correlation with the first source memory block in terms of one or more monitored parameters. For example, the monitored parameter may be the minimum and maximum LPNs for each closed memory block and the degree of overlay of the LPNs of the closed memory blocks with the LPN'S of the first source memory block (simply referred to as overlay). For example, at least one additional source memory block may be selected which has an LPN overlay with the first selected source memory block. In another example, the correlations for the respective memory blocks may include LPN overlays and LPN sequences for the respective memory blocks, and among closed memory blocks of the memory device, memory blocks having large LPN overlays and large LPN sequences may be selected as the source memory blocks, After that, at step 830, garbage collection is performed for the selected source memory blocks of the memory device. The garbage collection operation may include, copying the data stored in the valid pages of each selected source memory block and storing the copied data to and in a target memory block. The garbage collection operation may include performing an erase operation for the source memory blocks after the valid data are copied. For example, the target memory blocks may include empty memory blocks, open memory blocks or free memory blocks. In this way, a garbage collection operation of generating the source memory blocks as empty memory blocks, open memory blocks or free memory blocks is performed.

Since detailed descriptions were made above with reference to FIGS. 5 to 7, for performance of an operation of updating map data for the memory blocks of the memory device by sorting the map data (For example, the P2L segments of second map data) according to LPNs, an operation of selecting source memory blocks by checking correlations (for example LPN overlays and LPN sequences) among the memory blocks, and a garbage collection operation for the memory blocks of the memory device, further descriptions thereof will be omitted herein. Hereinbelow, detailed descriptions will be made with reference to FIGS. 9 to 14 for a data processing system and electronic appliances to which the memory system 110 including the memory device 150 and the controller 130 described above with reference to FIGS. 1 to 8, according to the embodiment, is applied.

Figure 9:
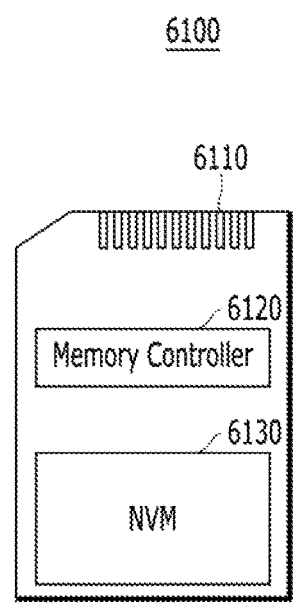
FIGS. 9 to 14 are diagrams illustrating examples of memory systems according to embodiments of the present invention.

FIG. 9 is a diagram illustrating a data processing system including the memory system according to the embodiment. FIG. 9 is a drawing schematically illustrating a memory card system to which the memory system according to an embodiment is applied.

Referring to FIG. 9, a memory card system 6100 includes a memory controller 6120, a memory device 6130, and a connector 6110.

In detail, the memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire universal flash storage (UFS), wireless-fidelity (WI-FI) and Bluetooth. Accordingly, the memory system and the data processing system according to the embodiment may be applied to wired/wireless electronic appliances. For example, a mobile electronic appliance.

The memory device 6130 may be implemented with a nonvolatile memory. For example, the memory device 6130 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (PCMCIA: Personal Computer Memory Card International Association), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 10:
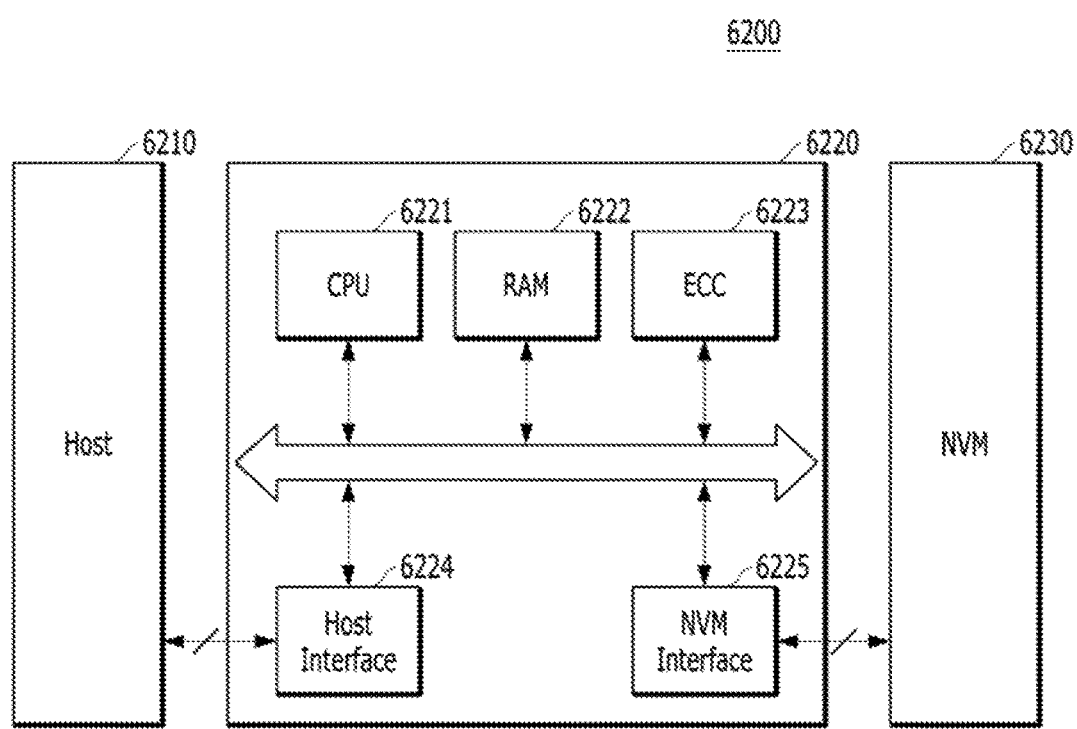

FIG. 10 is a diagram schematically illustrating an example of a data processing system including a memory system according to an embodiment of the present invention.

Referring to FIG. 10, a data processing system 6200 includes a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1, The memory controller 6220 may control the operations, including the read, write and erase operations for the memory device 6230 in response to requests received from a host 6210. The memory controller 6220 may include a central processing unit (CPU) 6221, a random access memory (RAM) as a buffer memory 6222, an error correction code (ECC) circuit 6223, a host interface 6224, and an NUM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed, The ECC circuit 6223 corresponds to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 transmits and receives data to and from the host 6210 through the host interface 6224, and transmits and receives data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, For example, a mobile electronic appliance.

Figure 11:
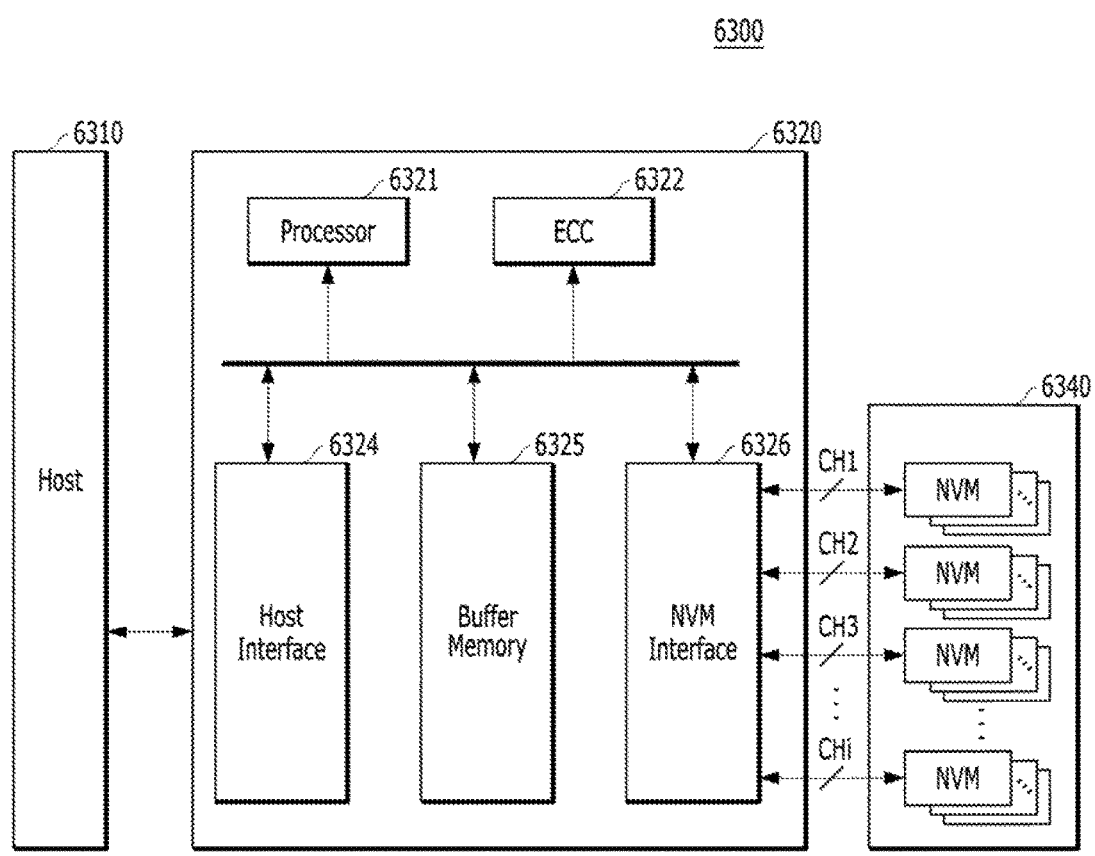

FIG. 11 is a diagram illustrating an example of a data processing system including a memory system according to an embodiment of the invention. FIG. 11 may be a solid state drive (SSD).

Referring to FIG. 11, an SSD 6300 may include a memory device 6340 which may include a plurality of nonvolatile memories NW, and a controller 6340. The controller 6320 may correspond to the controller 130 in the memory system 110 described above with reference to FIG. 1, and the memory device 6340 may correspond to the memory device 150 in the memory system 110 described above with reference to FIG. 1.

In detail, the controller 6320 may be connected with the memory device 6340 through a plurality of channels CH1, CH2, CH3, . . . and CH1. The controller 6320 may include a processor 6321 a buffer memory 6325, an error correction code (ECC) circuit 6322, a host interface 6324, and a nonvolatile memory (NVM) interface as a memory interface 6326 coupled via an internal bus.

The buffer memory 6325 temporarily stores data received from a host 6310 or data received from a plurality of nonvolatile memories NVMs included in the memory device 6340, or temporarily stores metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 11, for the sake of convenience in explanation, that the buffer memory 6325 is disposed inside the controller 6320, it is to be noted that the buffer memory 6325 may be disposed outside the controller 6320.

The ECC circuit 6322 calculates error correction code values of data to be programmed in the memory device 6340 in a program operation, performs an error correction operation for data read from the memory device 6340, based on the error correction code values, in a read operation, and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . and CH1.

As a plurality of SSDs 6300 to each of which the memory system 110 described above with reference to FIG. 1 is applied are used, a data processing system such as a redundant array of independent disks to (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (For example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (For example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 12:
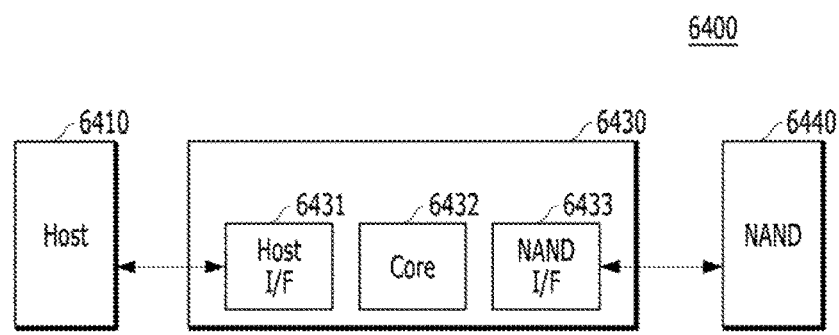

FIG. 12 is a diagram illustrating another example of a data processing system including the memory system according to an embodiment of the present invention. FIG. 12 is a drawing schematically illustrating an embedded multimedia card (eMMC) to which a memory system according to an embodiment is applied.

Referring to FIG. 12, an eMMC 6400 includes a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

In detail, the controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 13:
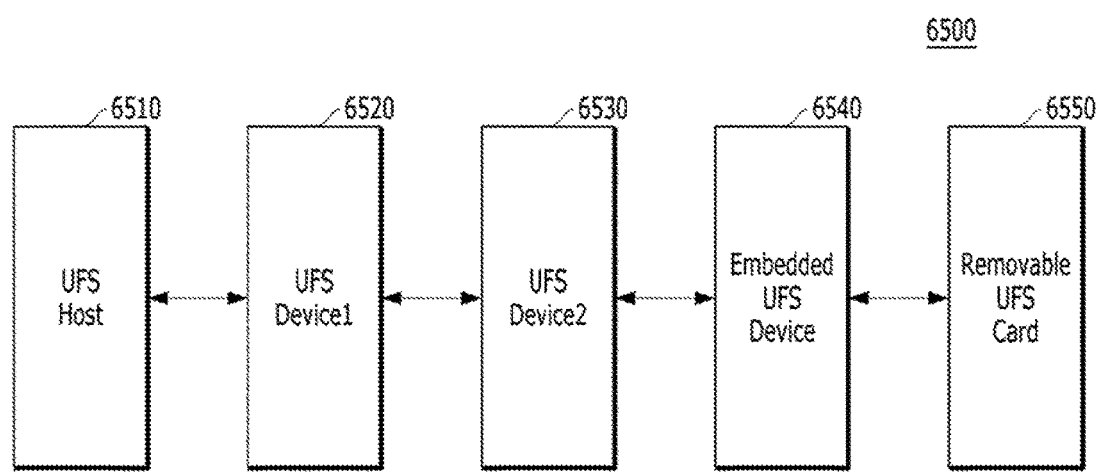

FIG. 13 is a diagram illustrating another example of a data processing system including a memory system according to an embodiment of the present invention. FIG. 12 is a drawing schematically illustrating a universal flash storage (UFS) to which the memory system according to the embodiment is applied.

Referring to FIG. 13, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol The UFS devices 6520 and 6530, the embedded UFS device 6540 and the removable UFS card 6550 may be implemented with the memory system 110 described above with reference to FIG. 1, for example, as the memory card system 6100 described above with reference to FIG. 9. The embedded UFS device 6540 and the removable UFS card 65 50 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 14:
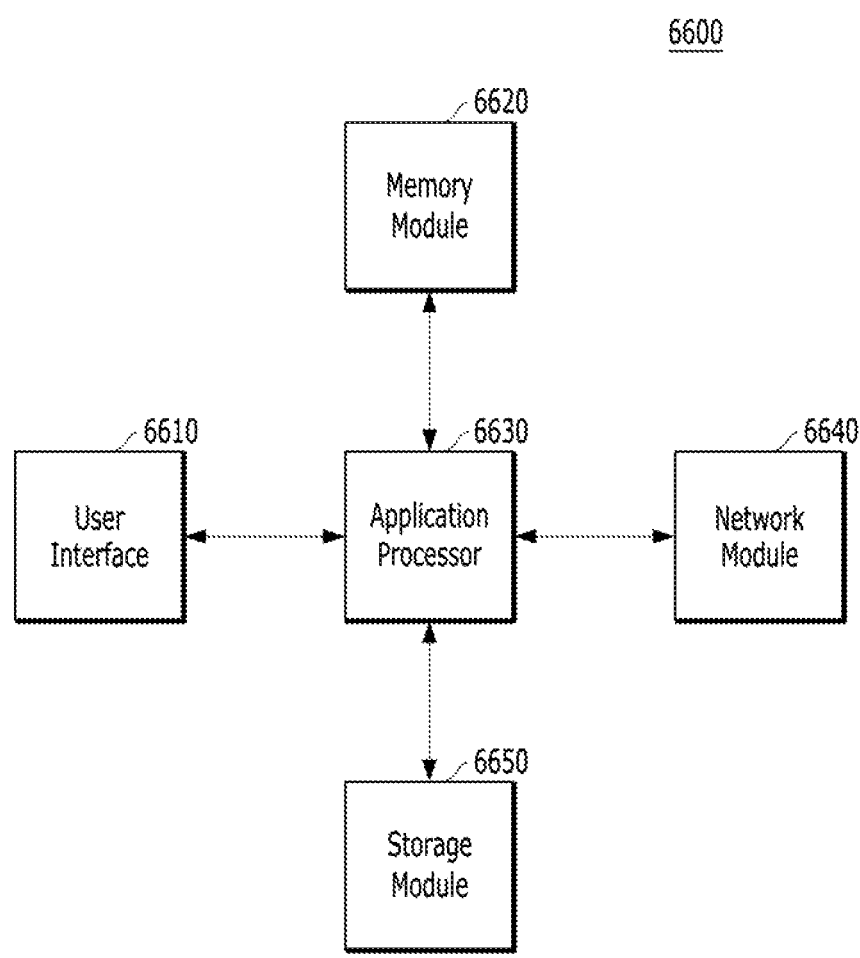

FIG. 14 is a diagram illustrating an example of a data processing system including the memory system according to an embodiment of the present invention. FIG. 14 is a drawing schematically illustrating a user system to which the memory system according to the embodiment is applied.

Referring to FIG. 14, a user system 6600 may include an to application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX) wireless local area network (WLAN), ultra-wideband (UWB), Bluetooth, wireless display (WI-DI) and so on, and may thereby communicate with wired/wireless electronic appliances. For example, a bile electronic appliance. According to this fact, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 11 to 13.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element and user output interfaces such as a liquid crystal display (LCD), an, organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The memory system and the operating method thereof according to the embodiments may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A method for operating a memory system, comprising:
    receiving a write command from a host, for a plurality of memory blocks of a memory device;
    storing user data corresponding to the write command, in the memory blocks;
    generating map segments of the user data stored in each memory block;
    sorting and updating the map segments in response to storing of the user data, according to logical information of the user data;
    individually recording minimum logical page numbers and maximum logical page numbers of map segments regarding each of the memory blocks;
    generating map data including the minimum logical page numbers and the maximum logical page numbers of the selected memory blocks;

checking the minimum logical page numbers and the maximum logical page numbers of the memory blocks to determine correlations for the memory blocks;

selecting source memory blocks among the memory blocks, based on the correlations for the memory blocks; and performing a garbage collection based on selecting the source memory blocks.

2. The method according to claim 1, wherein the selecting of the source memory blocks comprises determining the correlations for the memory blocks, through at least one of overlays and sequences of the logical information for the user data stored in the memory blocks.

3. The method according to claim 2, wherein the selecting of the source memory blocks comprises selecting, as the source memory blocks, a first memory block and a second memory block which have an overlay in the logical information, among the memory blocks.

4. The method according to claim 2, wherein the selecting of the source memory blocks comprises selecting, as the source memory blocks, a first memory block and a second memory block which have a sequence in the logical information, among the memory blocks.

5. The method according to claim 1, wherein the logical information of the user data includes logical page numbers (LPNs) of the user data stored in the memory blocks.

6. The method according to claim 5, wherein the map data include a list generated by recording minimum logical page numbers and maximum logical page numbers of the map segments for the memory blocks, and by indexes indicating the memory blocks.

7. The method according to claim 1, further comprising checking valid pages in the plurality of memory blocks to select at least one memory block in order to generate the map data.

8. The method according to claim 1, wherein the map segments include physical to logical (P2L) segments for the user data, in response to storing of the user data in the memory blocks.

9. The method according to claim 1, wherein the sorting and updating of the map segments comprises sorting indexes indicating storing in the memory blocks, in a sequence of the logical page numbers (LPNs) of the user data, in a physical to logical (P2L) table for the user data.

10. The method according to claim 1, further comprising:

copying and storing data stored in valid pages of the source memory blocks, in target memory blocks among the memory blocks, and performing an erase operation for the source memory blocks.

11. A memory system comprising:

a memory device including a plurality of memory blocks; and a controller suitable for:

storing user data corresponding to a write command received from a host, in the memory blocks, generating map segments of the user data stored in each memory block, sorting the map segments, according to logical information of the user data, individually recording minimum logical page numbers and maximum logical page numbers of the map segments regarding each of the memory block, generating map data including the minimum logical page numbers and the maximum logical page numbers regarding the memory blocks, checking the minimum logical page numbers and the maximum logical page numbers of the memory blocks to determine correlations for the memory blocks, selecting source memory blocks among the memory blocks based on the determined correlations, and performing a garbage collection based on selecting the source memory blocks.

12. The memory system according to claim 11, wherein the controller determines the correlations for the memory blocks, through at least one of overlays and sequences of the logical information for the user data stored in the memory blocks.

13. The memory system according to claim 12, wherein the controller selects, as the source memory blocks, a first memory block and a second memory block which have an overlay in the logical information, among the memory blocks.

14. The memory system according to claim 12, wherein the controller selects, as the source memory blocks, a first memory block and a second memory block which have a sequence in the logical information, among the memory blocks.

15. The memory system according to claim 11, wherein the logical information of the user data includes logical page numbers (LPNs) of the user data stored in the memory blocks.

16. The memory system according to claim 15, wherein the map data includes a list generated by recording minimum logical page numbers and maximum logical page numbers of the map segments for the memory blocks, and by indexes indicating the memory blocks.

17. The memory system according to claim 11, wherein the controller checks valid pages in the plurality of memory blocks to select at least one memory block in order to generate the map data.

18. The memory system according to claim 11, wherein the map segments include physical to logical (P2L) segments for the user data, in response to storing of the user data in the memory blocks.

19. The memory system according to claim 11, wherein the controller sorts indexes indicating storing in the memory blocks, in a sequence of the logical page numbers (LPNs) of the user data, in a physical to logical (P2L) table for the user data.

20. The memory system according to claim 11, wherein the controller copies and stores data stored in valid pages of the source memory blocks, in target memory blocks among the memory blocks, and performs an erase operation for the source memory blocks.

* * * * *